(12) United States Patent
Johansson et al.

(10) Patent No.: US 7,121,155 B2
(45) Date of Patent: Oct. 17, 2006

(54) PRESSURE INDICATING STRUCTURE

(75) Inventors: Ronald C. Johansson, Stillwater, MN (US); James L. Bries, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/025,566

(22) Filed: Dec. 29, 2004

(65) Prior Publication Data

US 2006/0137478 A1 Jun. 29, 2006

(51) Int. Cl.
G01L 1/04 (2006.01)
(52) U.S. Cl. .................... 73/862.621; 73/762
(58) Field of Classification Search ........... 73/862.621, 73/762
See application file for complete search history.

(56) References Cited

U.S. PATENT DOCUMENTS

| 3,648,835 | A | * | 3/1972 | Yucel ..................... 428/156 |
| 5,056,892 | A | | 10/1991 | Cobb, Jr. |
| 5,138,488 | A | | 8/1992 | Szczech |
| 6,060,157 | A | | 5/2000 | LaPerre et al. |
| 6,403,206 | B1 | | 6/2002 | Bries et al. |
| 6,548,164 | B1 | | 4/2003 | Bacon, Jr. |
| 2002/0086143 | A1 | | 7/2002 | Tanaka et al. |
| 2004/0126455 | A1 | | 7/2004 | Peterson et al. |

FOREIGN PATENT DOCUMENTS

| JP | 05-172666 | 7/1993 |
| JP | 09-015072 | 1/1997 |
| JP | 2000-136357 | 5/2000 |

* cited by examiner

*Primary Examiner*—Edward Lefkowitz
*Assistant Examiner*—Lori Moorman
(74) *Attorney, Agent, or Firm*—William L. Huebsch (57) ABSTRACT

A pressure indicating structure comprising (1) a translucent or transparent sheet including reflective structure defining at least a portion of a second surface of that sheet for reflecting back through a first opposite surface of the sheet light entering the sheet through its first surface, that reflective structure comprising a multiplicity of peak portions and recessed portions having recessed surface portions of the second surface that define recesses from the peak portions; and (2) a deformable layer comprising pressure sensitive adhesive having a major surface along the second surface of the sheet over the peak portions of the reflective structure. A predetermined pressure between the first surface of the sheet and the surface of the deformable material opposite the reflective structure can deform the pressure sensitive adhesive into the recesses to wet part or all of the recessed surface portions of the reflective structure thereby causing light to pass through the second surface along the wetted recessed surface portions instead of being reflected, which is visually observable to indicate that the predetermined pressure has been applied.

17 Claims, 6 Drawing Sheets

PRESSURE INDICATING STRUCTURE

FIELD OF THE INVENTION

The present invention relates to structures that provide an indication that predetermined amounts of pressure have been applied to surfaces.

BACKGROUND OF THE INVENTION

There are many situations in which it is useful to know whether or not a predetermined amount of pressure has been applied to a surface. One such situation is when a base plate of a structure adapted to support an item such as a hook, a soap dish, or a basket is to be adhered to a surface by a layer of stretch release pressure sensitive adhesive. The layer of stretch release pressure sensitive adhesive can firmly adhere a surface of the base plate to a surface (typically a vertical surface), and after the item is no longer needed, can be stretched from between the base plate and that surface to release its adhesion to the base plate and that surface. Several assemblies including such structures are commercially available from 3M Company, St. Paul, Minn., including an assembly commercially designated "Command™ Adhesive large hook #17003". It is important in adhering such a structure to a surface that a suitable amount of pressure is applied for a suitable amount of time to press the adhesive against the surface to which the structure is to be adhered (e.g., at least about 10 pounds per square inch of pressure or 0.7 kilograms per square centimeter should be applied for a few seconds) so that the adhesive will completely wet out that surface together with a surface of the base plate that will typically be wet out at a somewhat lower pressure (i.e., the surface to which the structure is to be adhered typically is rougher and harder to wet than the surface of the base plate). If the adhesive does not fully wet out the surface to which the structure is to be adhered, the bond strength of the adhesive with that surface can be reduced by over 50 percent. Persons applying the pressure typically do so for an adequate amount of time (i.e., about 5 to 10 seconds), however, adequate pressure is sometimes not applied. This is particularly so on base plates that are adapted to support large items such as jumbo hooks, which base plates have large surface areas that must be adhered to the surface by a large area of pressure sensitive adhesive (e.g., 4 square inches of adhesive) that requires a large application force (e.g., over about 40 pounds) to wet out that surface so that the full bond strength of the pressure sensitive adhesive can be developed. The pressure required to develop full bond strength of that large area of pressure sensitive adhesive can be applied by sequentially pressing on top, bottom and side portions of the base plate, however, the person applying such pressure is never quite sure that enough pressure has been applied to each of those portions. For example, the bottom and side portions may have had a sufficient amount of pressure applied, but insufficient pressure may have been applied to the top portion.

Another situation in which it is useful to know whether or not at least a predetermined amount of pressure or force has been applied to a surface is when an object is being shipped by commercial carrier, and the application of pressure or force above a predetermined amount during shipment could cause damage to that object.

SUMMARY OF THE INVENTION

The present invention provides a structure that can indicate whether or not a predetermined amount of pressure or force has been applied to a surface or can indicate the amount of pressure or force that has been applied to a surface. The structure can be used for many different purposes, particularly including, for example, (1) to indicate whether or not the base plate of an assembly of the type described above has been pressed against a surface with a suitable amount of pressure so that the adhesive should have substantially wet out that surface and the full bond strength of the adhesive can be developed, or (2) to indicate whether or not pressure or force above a predetermined amount (or what amount of pressure or force) has been applied to a surface of an object, such as to the surface of an object being shipped by a common carrier.

According to the present invention there is provided a pressure indicating structure comprising (1) a translucent or transparent sheet having opposite first and second major surfaces (e.g., a base sheet or plate for use in an assembly including a hook), reflective structure (e.g., particularly including retro-reflective structure that relies on total internal reflection (TIR)) defining at least a portion of that second surface for reflecting back through the first surface at an angle of observation in a predetermined range of observation angles (e.g., about 60 to 90 degrees) with respect to the first surface a visually significant amount of the light entering the sheet through its first surface, that reflective structure comprising a multiplicity of peak portions and recessed portions having recessed surface portions of the second surface that define recesses from the peak portions; and (2) a deformable layer comprising pressure sensitive adhesive (e.g., a stretch release pressure sensitive adhesive), the deformable layer having opposite major surfaces with one of those surfaces defined by the pressure sensitive adhesive adjacent the second surface of the sheet being adjacent and extending across the peak portions of the reflective structure and spaced from the recessed surface portions of the second surface. The shape and size of the peak portions and recessed portions of the reflective structure and the deformability of the deformable layer are selected or adapted so that a predetermined pressure (e.g., over about 10 Pounds per square inch or 0.7 kilograms per square centimeter) is needed between the first surface of the sheet and the surface of the deformable material opposite the reflective structure to deform the pressure sensitive adhesive of the deformable layer adjacent the reflective structure into the recesses to wet part or all of the recessed surface portions of the reflective structure. Such wetting of part or all of the recessed surface portions of the reflective structure causes light to pass through the second surface along the wetted recessed surface portions instead of being reflected, thereby causing significant visually observable changes in the appearance of the reflective structure when viewed through the first surface at an angle of observation in the predetermined range of observation angles with respect to the first surface to indicate that the predetermined pressure has been applied.

By an angle of observation with respect to the first surface we mean the angle between the first surface and the line of sight from a person's eye to the first surface.

The deformable layer can be formed entirely of pressure sensitive adhesive, or, to afford deformability of the deformable layer at a lower or higher predetermined pressure than is provided only by the use of a specific pressure sensitive adhesive, can include a layer of a material (e.g., polymeric foam, film, or both) that is more or less easily deformable than the pressure sensitive adhesive included in the deformable layer.

The translucent or transparent sheet can be of a polymeric material (e.g., polypropylene, polyurethane, polyvinyl chloride, polystyrene, polycarbonate, thermoplastic elastomers such as KRAYTON, or acrylic) and the reflective structure can be provided by molding, casting, or heat embossing the sheet to have closely spaced small retro-reflective cube structures (e.g., the small retro-reflective cube structures described in U.S. Pat. No. 5,138,488 (Szczech) and available from 3M Company, St. Paul, Minn., under the commercial designation VIP Diamond Grade Sheeting); or the sheet can be molded, cast, or extruded to provide closely spaced linear grooves with an included angle of about 90 degrees (e.g., the thin, flexible film made of a transparent polymeric material including a structured surface described in U.S. Pat. No. 5,056,892 (Cobb, Jr.)). Those reflective structures reflect back through the first surface (i.e., the surface of the plate opposite the surface in which they are molded, cast, or otherwise formed) a visually significant amount (e.g., 40 to 90 percent) of the light entering the plate through that first surface at an angle of observation in a predetermined range of observation angles (e.g., about 60 to 90 degrees) with respect to that first surface.

The second surface of the translucent or transparent sheet can have a planar surface portion, and the major surface of the deformable material adjacent the sheet can be adhered to the planar surface portion so that the deformable material can be seen through the first surface and the planar surface portion of the translucent or transparent sheet; and the reflective structure can define a plurality of portions of the second surface of the sheet for reflecting light directed into the sheet through its first surface back through the first surface at an angle of observation in the predetermined range of observation angles with respect to that first surface. Those plurality of portions of the second surface defined by the reflective structure can be in the form of indicia (e.g., symbols or words such as "PUSH") visible through the first surface, so that when the pressure sensitive adhesive of the deformable layer is pressed into the recesses of the reflective structure by the predetermined pressure to wet part or all of the recessed surface portions of the reflective structure the deformable material will be seen through the first surface and the wetted recessed surface portions so that the visibility of the indicia through the first surface at an angle of observation in the predetermined range of observation angles (e.g., about 60 to 90 degrees) with respect to that first surface will be significantly decreased or the indicia will disappear to indicate that the predetermined pressure has been applied. Those indicia can be distributed around the second surface of the sheet to indicate, when the layer of adhesive material is pressed into the recesses of the reflective structure and the indicia become much less visible or are no longer visible through the first surface of the plate, that the predetermined pressure has been applied over the entire first surface of the sheet.

The plate can be rigid and can include a hook portion or means for supporting an item (e.g., a hook, a soap dish, a tooth brush holder, or a basket for use in a shower) along its first surface, and the layer of deformable material can have pressure sensitive adhesive (e.g., stretch release adhesive) along both of its major surfaces so that it can adhere the plate to a surface, (e.g., the plate can be essentially the same as the plate or plates included in the assemblies commercially designated "Bathroom Hook", product no. 17600B; "Shower Caddy" product no. 17603B; and "Soap Dish", product no. 17602B that are currently available from 3M Company, St. Paul, Minn., except for the addition of the reflective structure on the second surface of that plate).

Alternatively, the deformable layer can have a color or bear indicia visible through the first surface of the plate opposite the reflective structure at observation angles in the predetermined angle with respect to the first surface only when the layer of pressure sensitive adhesive material is pressed into the recesses of and wets part or all of the recessed surface portions of the reflective structure.

DESCRIPTION OF DRAWING

The present invention will be further described with reference to the accompanying drawing wherein like reference numerals refer to like parts in the several views, and wherein.

DETAILED DESCRIPTION OF THE INVENTION

Figure 2:
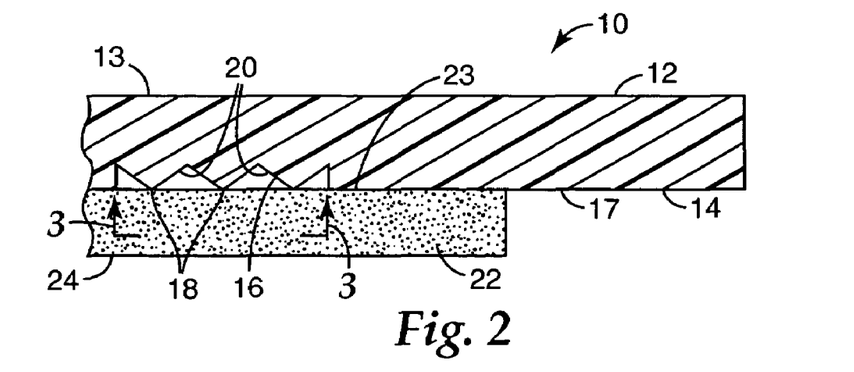
FIG. 2 is a fragmentary enlarged sectional view taken approximately along line 2—2 of FIG. 1.
Figure 3:
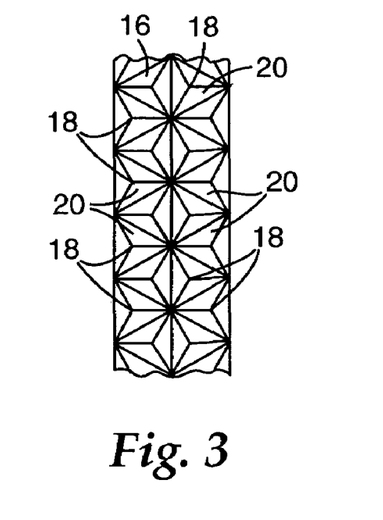
FIG. 3 is a fragmentary view of a reflective structure in the pressure indicating structure of FIG. 1, which view is taken approximately along line 3—3 of FIG. 2.
Figure 4:
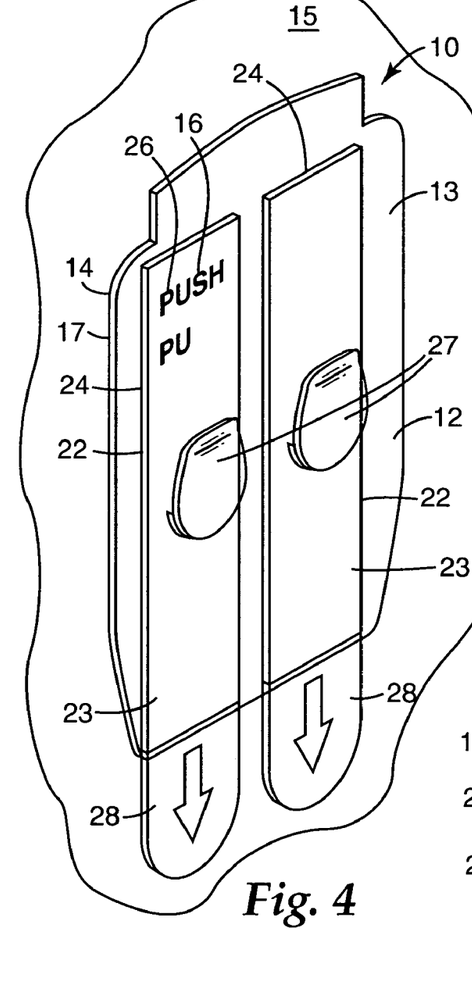
FIG. 4 is an isometric view of the pressure indicating structure of FIG. 1 illustrating a result of applying pressure to deform a layer of adhesive material included in the structure into engagement with a vertical surface to which the hook structure is being adhered over a major portion of the structure.

Referring now to FIGS. 1 through 4 of the drawing there is illustrated a first embodiment of a pressure indicating structure 10 according to the present invention that can be releasably adhered to a surface 15 (see FIG. 4).

Generally, the pressure indicating structure 10 comprises a translucent or transparent polymeric sheet or plate 12 having opposite first and second major surfaces 13 and 14. A portion 17 of the second major surface 14 of the plate 12 is planar. The plate 12 has reflective structure 16 defining non-planar portions of its second surface 14, which reflective structure 16 is in the shape of indicia 26 (i.e., the words "PUSH" as illustrated). The reflective structure 16 reflects back through the first surface 13 at an observation angle in a predetermined range of angles with respect to the first surface 13 (e.g., at an observation angle in the range of about 60 to 90 degrees with respect to that first surface 13) a visually significant amount of the light entering the plate 12 through its first surface 13. The reflective structure 16 (see FIGS. 2 and 3) comprises a multiplicity of peak portions 18 and recessed portions having recessed surface portions 20 of the second surface 14 defining recesses from the peak portions. The pressure indicating structure 10 also includes a deformable layer 22 comprising pressure sensitive adhesive. The deformable layer 22 has opposite inner and outer major surfaces 23 and 24, both of which surfaces 23 and 24 are defined by pressure sensitive adhesive. The inner surface 23 of the deformable layer 22 is supported along the second surface 14 of the sheet adjacent (i.e., in contact with or spaced from) the peak portions 18 of the reflective structure, spaced from the recessed surface portions 20 of the second surface 14, and adhered to the planar portion 17 of the second surface 14. The outer surface 24 of the deformable layer 22 can be used to adhere the structure 10 to a surface such as the vertical surface 15 shown in FIG. 4. The shape and size of the peak portions 18 and recessed portions of the reflective structure and the deformability of the deformable layer 22 are adapted so that a desired predetermined pressure (e.g., at least about 10 pounds per square inch or 0.7 kilograms per square centimeter) is needed between the outer surface 24 of the deformable layer 22 and the first surface 13 of the plate 12 to deform the pressure sensitive adhesive defining the inner surface 23 of the deformable layer 22 into the recesses to wet part or all of the recessed surface portions 20 of the reflective structure 16. Such wetting of part or all of the recessed surface portions 20 of the reflective structure 16 causes light to pass through the second surface 14 of the plate 12 along the wetted recessed surface portions 20 instead of being reflected, thereby causing significant visually observable changes in the appearance of the reflective structure 16 at the observation angle in the predetermined range to indicate that at least the predetermined pressure has been applied.

Figure 1:
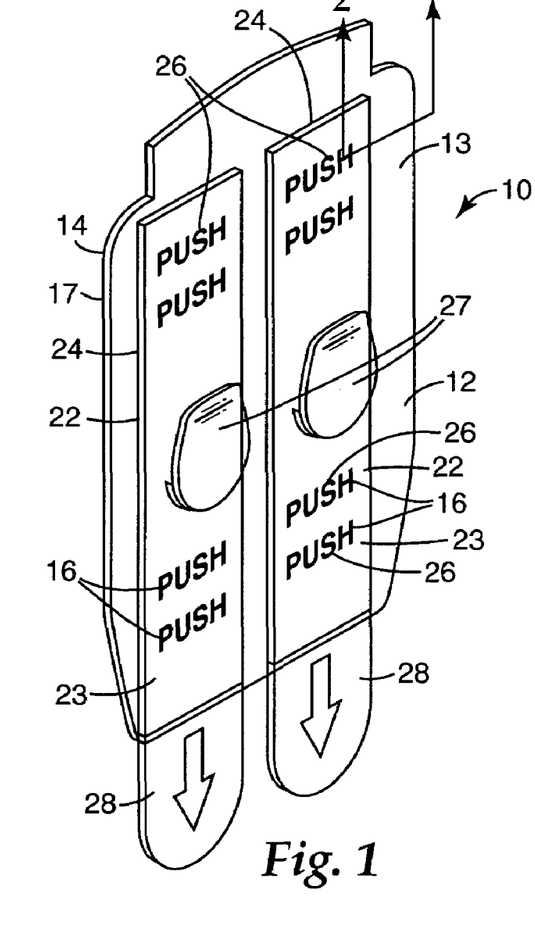
FIG. 1 is an isometric view of a first embodiment of a pressure indicating structure according to the present invention.

Light passes through the transparent or translucent plate 12 so that the deformable layer 22 can always be seen through the first surface 13 along the planar portion 17 of the second surface 14. The deformable layer 22, however, is spaced from the recess surface portions 20 so that the reflective structure 16 reflects such light back into the plate 12 and through its first surface 13. Thus, the indicia formed by the reflective structure 16 are easily visually distinguished from the planar portions 17 of the second surface 14 at an observation angle in the predetermined range (i.e., the color of the deformable layer 22 can be seen through the first surface 13 and planar portions 17 of the second surface 14, whereas the indicia 26 formed by the reflective structure 16 appear gray). When the deformable layer 22 is pressed partially or fully into the recesses by application of the predetermined amount of pressure, however, the pressure sensitive adhesive defining its first surface 23 wets part or all of the recessed surface portions 20 of the reflective structure 16, and that wetting of the surface portions 20 causes light to pass through the second surface 14 along the reflective structure 16 so that the color of the deformable layer 22 can also be seen along the reflective structure 16 through the first and second surfaces 13 and 14 and the indicia 26 (i.e., the words "Push" as illustrated) defined by the reflective structure 16 become much less visible or disappear to indicate that at least the predetermined amount of pressure has been applied.

The reflective structure 16 is provided by molding the plate 12 to have (as seen in FIGS. 2 and 3) closely spaced small retro-reflective cube structures with the recessed surface portions 20 that are recessed from the peak portions 18 (e.g., the recessed surface portions 20 can be recessed at a maximum in the range of about 0.001 to 0.007 inch or 0.0025 to 0.0178 cm from the peak portions 18 with the peak portions 18 being spaced apart in the range of about 0.002 to 0.014 inch or 0.005 to 0.036 cm). Such small retro-reflective cube structures are described in U.S. Pat. No. 5,138,488 (Szczech) incorporated herein by reference and are commercially available under the trade designation VIP Diamond Grade Sheeting from 3M Company, St. Paul, Minn. The reflective structure 16 reflects back through the first surface 13 (i.e., the surface of the plate 12 opposite the surface along which it is molded) a visually significant amount (e.g., 40 to 90 percent) of the light entering the plate 12 through that first surface 13 at observation angles in the range of about 60 to 90 degrees with respect to that first surface 13.

As illustrated, the reflective structure 16 is molded with the peak portions 18 about aligned with the planar surface portion 17 and the recessed surface portions 20 recessed from the planar surface portion 17. Alternatively, the reflective structure could be molded with the peak portions 18 projecting above the planar surface portion 17 and the recessed surface portions 20 somewhat aligned with or above the planar surface portion 17; or with the peak portions 18 slightly recessed from the planar surface portion 17. In the illustrated embodiment, the planar surface portion 17 is aligned with the peak portions 18 of the reflective structure 16. It will be recognized, however, that if the peak portions 18 project beyond the planar surface portion 17 (i.e. the planar portion 17 is aligned somewhere along the recessed surface portions 20), less force applied to the first surface 13 of the pressure indicating structure 10 will be required to produce the same pressure in the area of the reflective structure, thereby wetting out the reflective structure at a lower applied force. In addition, as the size of the reflective structure is increased, the pressure needed to wet out the surface of the reflective structure will also increase. Thus, the force needed to wet out the surface of the reflective structure 16 (and thereby make the indicia visible) can be controlled, for example, by adjusting the position of the peak portions 18 relative to the planar surface portion 17 and/or by adjusting the size of the reflective structure.

Molding the plate 12 to have the closely spaced small retro-reflective cube structures forming the reflective structures 17 with the planar surface portion 17 around them can require special molding techniques to insure the accuracy of the reflective structures, such as the molding techniques described in U.S. Pat. No. 6,939,123, the content of which application is incorporated herein by reference.

The plate 12 has sufficient rigidity between its first and second major surfaces 13 and 14 to maintain the shape of the reflective structure 16 when the predetermined pressure is applied to deform the pressure sensitive adhesive defining the inner major surface 23 of the deformable layer 22 into engagement with the recessed surface portions 20 of the reflective structure 16.

Selecting the characteristics of the reflective structure 16 and the deformability of the deformable layer 22 so that a desired predetermined pressure is required to deform the pressure sensitive adhesive defining the first surface 23 of the deformable layer 22 into the recesses to wet part or all of the recessed surface portions 20 of the reflective structure 16 can include (1) increasing or decreasing the deformability of the deformable layer 22 by selecting a pressure sensitive adhesive with a high or low viscosity and/or the inclusion of layers of material in the deformable layer 22 that increase or decrease its deformability and/or adjusting the thickness of the deformable layer 22; and/or (2) adjusting the size and spacing of the peak portions 18, the depth of recessed portions of the reflective structure, and the location of the peak portions 18 with respect to the planar surface portion 17 (i.e., with the same deformable layer 22 and shape for the peak portions and recessed portions of the reflective structure 16 it takes less pressure to deform the deformable layer 22 when the peak portions 18 project above the planar surface portion 17 than when the peak portions 18 are recessed from the planar surface portion 17). Also, the temperature at which the pressure indicating structure 10 will be used can significantly effect the pressure required to deform the pressure sensitive adhesive defining the first surface 23 of the deformable layer 22 into the recesses to wet part or all of the recessed surface portions 20 of the reflective structure 16, such deformation for the same reflective structure 16 and deformable layer 22 material typically being less at temperatures significantly below normal room temperature and being less at temperatures significantly above normal room temperatures. Examples given in this application are for use at or near normal room temperatures.

The indicia 26 are distributed around the second surface 14 of the plate 12 so that the indicia 26 indicate when they become much less visible or invisible through the first surface 13 of the plate 12 at an observation angle in the predetermined range of observation angles, that at least the predetermined pressure has been applied to the first surface 13 of the plate 12 to adhere the pressure sensitive adhesive on the outer surface 24 of the deformable layer 22 to the vertical surface 15. As seen in FIG. 4, such predetermined pressure has been applied to properly adhere the pressure sensitive adhesive on the layer of deformable material 22 to the surface 15 except in the areas where the indicia 26 are still visible.

The sheet or plate 12 is rigid and includes two integrally molded projecting distally headed portions 27 projecting from its first surface 13. The headed portions 27 can serve as hooks, or can be used in an assembly to releasably support items such as a larger hook, a soap dish, a tooth brush holder, or a basket for use in a shower. The plate 12 is essentially the same as the plate or plates included in the assemblies including "Command"™ water-resistant strips of stretch release adhesive that are commercially designated "Bathroom Hook", product no. 17600B; "Shower Caddy" product no. 17603B; "Soap Dish", product no. 17602B; "Tooth Brush/Raiser Holder", product no. 17601B; and "Caddy", product no. 17604B, and are currently available from 3M Company, St. Paul, Minn.; which plate 12 has been modified by the addition of the reflective structure 16 on the second surface 14 of the plate 12.

The pressure sensitive adhesive in the layer of deformable material 22 can, as illustrated, be formed by two lengths of stretch release adhesive adapted to adhere the plate 12 to a surface such as the vertical surface 15. Should it be desired to remove the plate 12 from a surface such as the surface 15 to which it is adhered by the layer of deformable material 22, that layer of deformable material 22 can be stretched from between the second surface 14 of the plate 12 and the surface 15 by pulling the end portions 28 of the lengths of stretch release adhesive projecting from the plate 12 in the direction indicated by the arrow. Such stretching will cause the deformable material 22 to release its adhesion to the plate 12 and to that vertical surface 15. The plate 12 can then be used again with a new layer of deformable material 22. The lengths of stretch release pressure sensitive adhesive used for the deformable material 22 can be those lengths of stretch release adhesive that are included with the assemblies identified in the preceding paragraph and that are also commercially available from 3M Company, St. Paul, Minn., under the trade designation "Command™ adhesive, "Command"™ strips, and "Command"™ water-resistant strips. Those lengths of stretch release pressure sensitive adhesive, (described in greater detail in U.S. Pat. No. 6,403,206 incorporated herein by reference), each include two layers of stretch release pressure sensitive adhesive that define its major surfaces adhered on opposite sides of a layer of polymeric foam or film that makes the strip more deformable than it would be if the layer of foam or film was not present.

Figure 5:
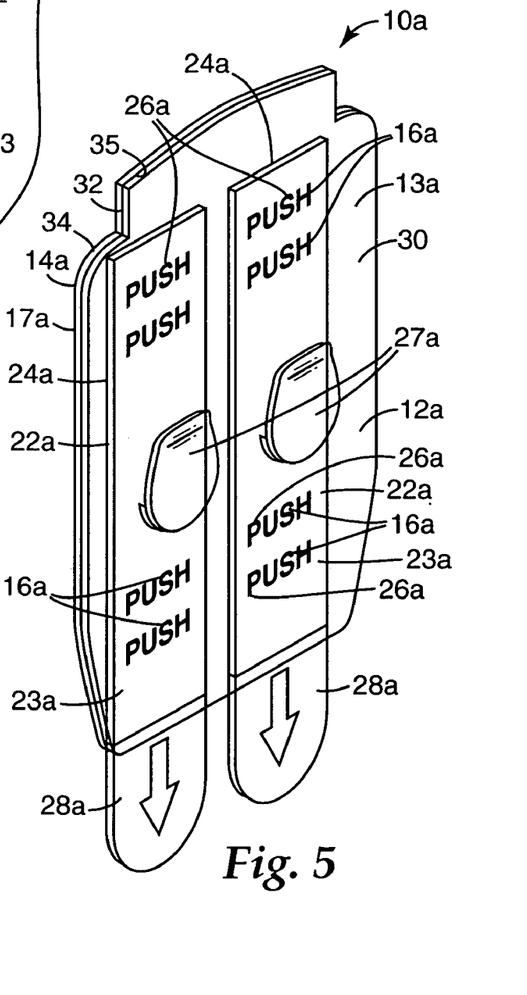
FIG. 5 is an isometric view of a second embodiment of a pressure indicating structure according to the present invention.

The plate 12 can be molded with the reflective structure 16 on its second surface 14 as illustrated in FIGS. 1 through 4. Alternatively, a plate 12a illustrated in FIG. 5 can be used in a pressure indicating structure 10a that functions in the same manner as the plate 12 of the pressure indicating structure 10. Reference numerals have been used with the addition of the suffix "a" for identifying parts of the pressure indicating structure 10a illustrated in FIG. 5 that correspond to parts of the pressure indicating structure 10. The plate 12a can be formed by molding a molded part 30 of the plate 12a that provides its first major surface 13a and with which are integrally molded the projections 27a, which molded part 30 has a planar surface 32 opposite the first major surface 13a; and by casting a second cast part 34 that provides the second major surface 14a including its planar portion 17a and the reflective structure 16a and has a planar surface 35 opposite the second major surface 14a. Surfaces 32 and 35 of the molded and cast parts 30 and 34 are adhered together by a layer of a suitable adhesive. This plate 12a structure may provide production advantages because it may be easier to cast then to mold the reflective structure 16a.

Figure 6:
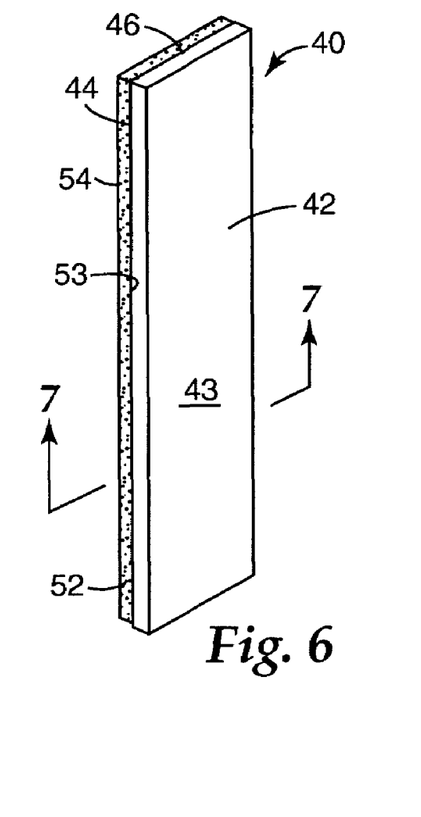
FIG. 6 is an isometric view of a third embodiment of a pressure indicating structure according to the present invention.
Figure 7:
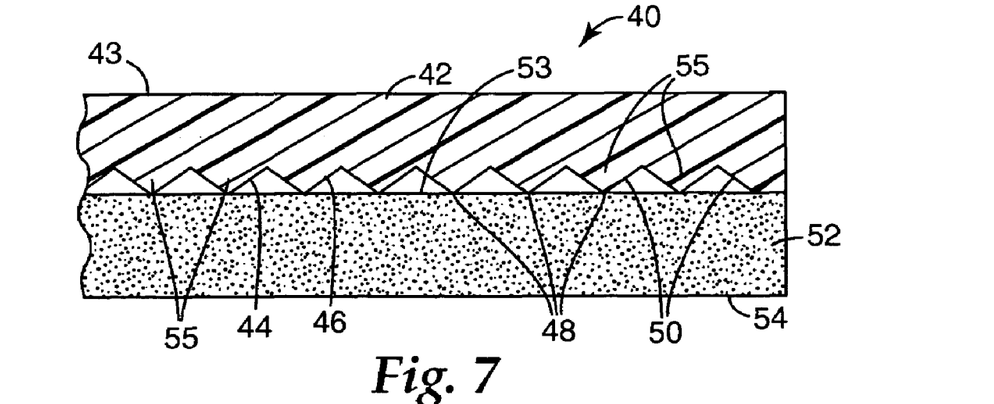
FIG. 7 is an enlarged sectional view of the pressure indicating structure of FIG. 5 taken approximately along line 7—7 of FIG. 6.
Figure 8:
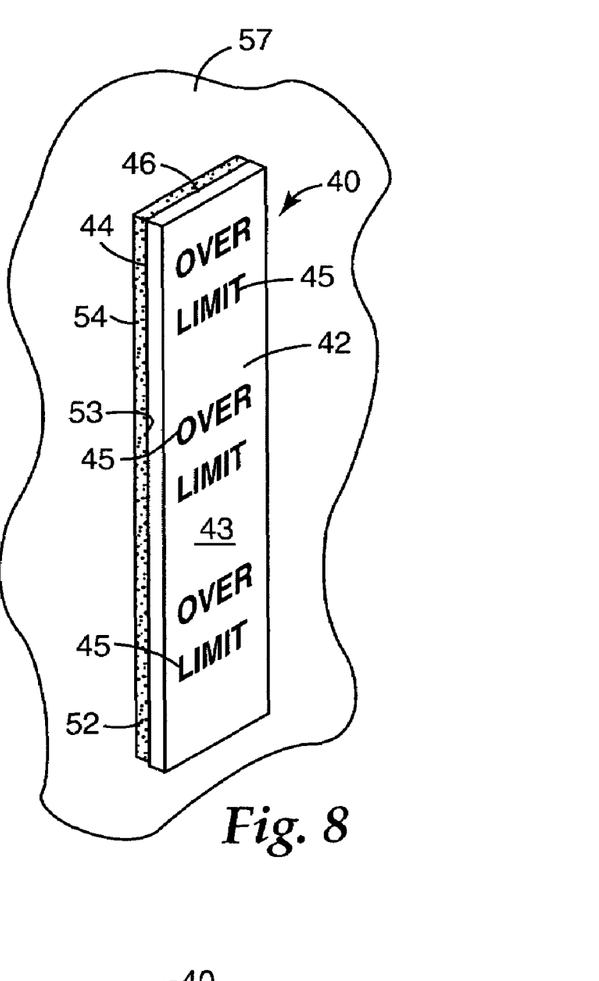
FIG. 8 is an isometric view of the pressure indicating structure of FIG. 6 indicating that pressure of at least a predetermined amount has been applied to a surface to which the pressure indicating structure is adhered.

Referring now to FIGS. 6 through 8 of the drawing there is illustrated a third embodiment of a pressure indicating structure according to the present invention generally indicated by the reference numeral 40.

Generally, the pressure indicating structure 40 comprises (1) a stiff but flexible translucent or transparent sheet 42 having opposite first and second major surfaces 43 and 44, reflective structure 46 defining the second surface 44 of the plate 42 for reflecting back through the first surface 43 at an observation angle in a predetermined range of observation angles (e.g., 60 to 90 degrees) with respect to the first surface 43 a visually significant amount of the light entering the plate 42 through its first surface 43. The reflective structure 46 (see FIG. 7) comprises a multiplicity of parallel elongate peak portions 48 and recessed portions having recessed surface portions 50 of the second surface 44 defining recesses from the peak portions; and (2) a deformable layer 52 comprising pressure sensitive adhesive (e.g., stretch release pressure sensitive adhesive) having opposite inner and outer major surfaces 53 and 54 with its inner surface 53 adjacent the second surface 44 of the sheet 42 laying along and in contact with the peak portions 48 of the reflective structure 46 and spaced from the recessed surface portions 50 of the second surface 44.

The shape and size of the peak portions 48 and recessed surface portions 50 of the reflective structure 46 and the deformability of the deformable layer 52 are adapted so that a predetermined pressure is needed between the first surface 43 of the sheet 42 and the outer surface 54 of the deformable layer 52 to deform the pressure sensitive adhesive defining the inner surface 53 of the deformable layer into the recesses to wet part or all of the recessed surface portions 50 of the reflective structure 46. Such wetting of part or all of the recessed surface portions 50 of the reflective structure 46 causes light to pass through the second surface 44 along the wetted recessed surface portions 50 instead of being reflected, thereby causing significant visually observable changes in the appearance of the reflective structure 46 at an observation angle in the predetermined range of observation angles to indicate that at least the predetermined pressure has been applied along the first surface 43.

The translucent or transparent sheet 42 can be of a stiff but flexible polymeric material (e.g., 0.013 inch or 0.033 cm thick polycarbonate), which sheet 42 has sufficient rigidity between its first and second major surfaces 43 and 44 to maintain the shape of the reflective structure 46 when the predetermined pressure is applied to deform the pressure sensitive adhesive defining the inner major surface 53 of the deformable layer 52 into engagement with the recessed surface portions 50 of the reflective structure 46. Alternatively, the sheet 42 could be made of a translucent or transparent polymeric material that deforms when the predetermined pressure is applied to deform the pressure sensitive adhesive defining the inner major surface 53 of the deformable layer 52 into engagement with the recessed surface portions 50 of the reflective structure 46.

The reflective structure 46 can be provided by molding, casting, or extruding the sheet 42 to have (as seen in FIG. 7) closely spaced small elongate parallel generally triangular ridges 55 having the peak portions 48 at their apexes with the recessed surface portions 50 between them that are recessed at a maximum in the range of about 0.001 to 0.007 inch or 0.0025 to 0.0178 cm from the peak portions 48, while the peak portions 48 are spaced apart in the range of about 0.002 to 0.014 inch or 0.005 to 0.036 cm (e.g., the small reflective structure described in U.S. Pat. No. 5,056,892, (Cobb, Jr.) incorporated herein by reference. These reflective structures 46 reflect back through the first surface 43 (i.e., the surface of the plate 42 opposite the surface along which they are molded) a visually significant amount (e.g., 40 to 90 percent) of the light entering the plate 42 through that first surface 43 at observation angles in the predetermined range of observation angles (e.g., about 60 to 90 degrees) with respect to that first surface 43.

The reflective structure 46 in the sheet 42 prevents a person from seeing the deformable layer 52 through the sheet 42 and provides a silvery appearance for the sheet 42 when the first surface 43 of the sheet 42 is viewed at an observation angle in the predetermined range of observation angles. When the pressure sensitive adhesive of the deformable layer 52 is pressed into the recesses of the reflective structure 46 and wets part or all of the recessed surface portions 50 and/or deforms the reflective structure 46, however, the deformable layer 52 will be visible through the first surface 43 thereby indicating that at least such predetermined pressure has been applied. That indication will be particularly evident if the deformable layer 52 is a color (e.g., white) that contrasts with the silvery appearance for the sheet 42 described above. Additionally, indicia 45, such as symbols or words (e.g., the words "OVER LIMIT" as illustrated in FIG. 8 to indicate that at least a predetermined pressure has been applied), may be printed on the inner surface 53 of the deformable layer 52 (e.g., red or black indicia on white deformable material 52) or, if the deformable material 52 is of a transparent pressure sensitive adhesive, may alternatively be printed within the layer 52, or on its outer surface 54, or on a surface along the outer surface 54 of (e.g., below) the layer of deformable material 52. Such indicia 45 will only become visible through the first surface 43 of the plate 42 when the deformable layer 52 is pressed into the recesses of the reflective structure 46 and wets part or all of the recessed surface portions 50. Both the inner and outer surfaces 53 and 54 of the deformable layer 52 can be formed by layers of pressure sensitive adhesive (e.g., stretch release pressure sensitive adhesive) so that the outer surface 54 can be used to adhere the plate 42 to a surface such as the surface 57 illustrated in FIG. 8. Thus, for example, the pressure indicating structure 40 could be adhered along the surface 57 of an object, such as an object being moved from one place to another by a common carrier, to indicate whether or not pressure of at least a predetermined amount was applied to that surface 57 of the object while it was being moved. FIG. 8 illustrates the indicia 45 being visible through the first surface 43 of the plate 42, thereby indicating that a pressure of at least a predetermined pressure has been applied to the surface 57 through the pressure indicating structure 40.

Alternatively, the reflective structure 46 can be provided by molding or casting the sheet 42 to have closely spaced small retro-reflective cube structures with recessed surface portions that are recessed from peak portions of the type described above with reference to the reflective structure 16 of the pressure indicating structure 10.

Figures 9, 10, 11:
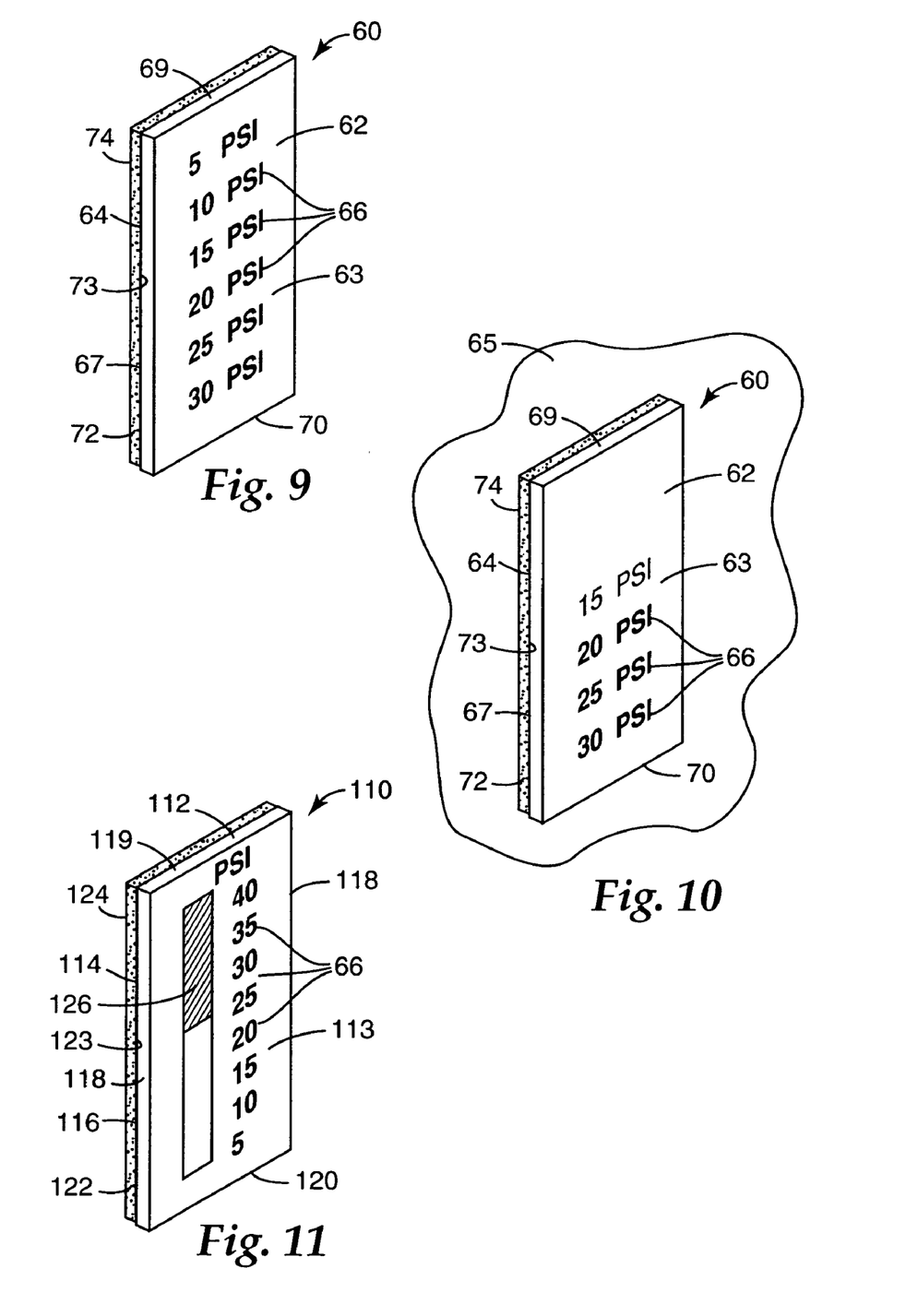
FIG. 9 is an isometric view of a fourth embodiment of a pressure indicating structure according to the present invention.
FIG. 10 is an isometric view of the pressure indicating structure of FIG. 9 indicating that pressure of a specific amount has been applied through the pressure indicating structure to a surface to which the pressure indicating structure is adhered.
FIG. 11 is an isometric view of a fifth embodiment of a pressure indicating structure according to the present invention.

FIGS. 9 and 10 illustrate a fourth embodiment of a pressure indicating structure according to the present invention generally indicated by the reference numeral 60.

Generally, the pressure indicating structure 60 comprises a translucent or transparent polymeric sheet or plate 62 having opposite first and second major surfaces 63 and 64. A portion 67 of the second major surface 64 of the plate is planar. The plate 62 has reflective structure similar to the reflective structure 16 of the pressure indicating structure 10 defining non-planar portions of its second surface 64, which reflective structure is in the shape of indicia 66 (i.e., the indicia "5 PSI, 10 PSI, 15 PSI" etc. as illustrated). The reflective structure in the shape of the indicia 66 reflects back through the first surface 63 at an angle of observation in a predetermined range of angles of observation (e.g., 60 to 90 degrees) with respect to the first surface 63, a visually significant amount of the light entering the plate 62 through its first surface 63. The reflective structure, like the reflective structure 16 in the pressure indicating structure 10, comprises a multiplicity of peak portions and recessed portions having recessed surface portions of the second surface defining recesses from the peak portions, but differs from the reflective structure 16 in that at least some of the size, and spacing of the peak portions and/or the depth of the recessed portions are different for each of the indicia 66, with, as illustrated, the depth of the recessed portions increasing for the indicia 66 from a top 69 of the plate 62 toward a bottom 70 of the plate 62. The pressure indicating structure 60 also includes a deformable layer 72 comprising pressure sensitive adhesive. The deformable layer 72 has opposite inner and outer major surfaces 73 and 74. The inner surface 73 is defined by the pressure sensitive adhesive, whereas the outer surface 74 may or may not be defined by the pressure sensitive adhesive. The inner surface 73 of the deformable layer 72 is supported along the second surface 64 of the sheet adjacent (e.g., in contact with) the peak portions of the reflective structure, spaced from the recessed surface portions of the second surface 64, and adhered to the planar portion 67 of the second surface 64. The outer surface 74 of the deformable layer 72 (if defined by the pressure sensitive adhesive) can be used to adhere the structure 60 to a vertical surface 65 as is shown in FIG. 10. The shape and size of the peak portions and recessed portions of the reflective structure and the deformability of the deformable layer 72 are adapted so that the predetermined pressure represented by each indicia 66 (e.g., 5 PSI or 10 PSI or 15 PSI) is needed between the first surface 63 of the sheet 62 and the outer surface 74 of the deformable layer 72 to deform the pressure sensitive adhesive defining the inner surface 63 of the deformable layer 62 into the recesses to wet part or all of the recessed surface portions of the reflective structure defining that indicia 66. Such wetting of part or all of the recessed surface portions of the reflective structure causes light to pass through the second surface 64 of the sheet 62 along the wetted recessed surface portions instead of being reflected, thereby causing significant visually observable changes in the appearance of the reflective structure at an observation angle in the predetermined range of observation angles with respect to the first surface 63 (i.e., the reflective structure becomes much less visible or disappears) to indicate that the predetermined pressure has been applied. Thus, the reflective structure can provide an indication of the amount of pressure that has been applied between the first surface 63 of the sheet 62 and the outer surface 74 of the deformable layer 72, and thereby also against the surface 65, with that indication being about 15 PSI as illustrated in FIG. 10.

Alternatively, the reflective structure on the sheet 62 could be similar to the reflective structure 46 of the pressure indicating structure 40 and could be across the entire second surface 64 of the sheet 62, but differing from the reflective structure 46 in that at least some of the size, and spacing of the peak portions and/or the depth of the recessed portions are different, for example, the depth of the recessed portions increasing from the top 69 of the plate 62 toward the bottom 70 of the plate 62; and the indicia 66 could be printed on the deformable layer 72 so that indicia 66 indicating pressures of increasing amounts could be seen through the first surface 63 of the sheet after corresponding pressure has been applied thereto to deform the deformable layer 72 into the reflective structure.

FIG. 11 illustrates a fifth embodiment of a pressure indicating structure according to the present invention generally indicated by the reference numeral 110.

Generally, the pressure indicating structure 110 comprises a translucent or transparent polymeric sheet or plate 112 having opposite first and second major surfaces 113 and 114, reflective structure 116 defining the second surface 114 of the plate 112 for reflecting back through the first surface 113 at an observation angle in a predetermined range of observation angles (e.g., about 60 to 90 degrees) with respect to the first surface 113 a visually significant amount of the light entering the plate 112 through its first surface 113, that reflective structure 116 comprising a multiplicity of parallel elongate peak portions and recessed portions having recessed surface portions of the second surface 114 defining recesses from the peak portions; and (2) a deformable layer 122 comprising pressure sensitive adhesive having opposite inner and outer major surfaces 123 and 124 with its inner surface 123 supported along the second surface 114 of the sheet 112 laying adjacent and in contact with the peak portions of the reflective structure 116 and spaced from the recessed surface portions of the second surface 114. The elongate peak portions and recessed portions having recessed surface portions of the second surface 114 extend between opposite sides 118 of the sheet 112 and increase in depth and/or spacing from a bottom 120 to a top 119 of the sheet 112.

The shape and size of the peak portions and recessed surface portions of the reflective structure 116 and the deformability of the deformable layer 122 are adapted so that predetermined pressures are needed between the outer surface 124 of the deformable layer 122 and the first surface 113 of the sheet 112 to deform the pressure sensitive adhesive defining the inner surface 114 of the deformable layer into the recesses to wet part or all of the recessed surface portions of the reflective structure 116. Such needed predetermined pressures to deform the pressure sensitive adhesive defining the inner surface 114 of the deformable layer into the recesses to wet part or all of the recessed surface portions of the reflective structure 116 are progressively greater from the bottom 120 of the sheet 112 toward the top 119 of the sheet 112. Such wetting of part or all of the recessed surface portions of the reflective structure 116 causes light to pass through the second surface 114 along the wetted recessed surface portions instead of being reflected, thereby causing significant visually observable changes in the appearance of the reflective structure 116 at an observation angle in the predetermined range of observation angles with respect to the first surface 113 to indicate the predetermined pressure that has been applied along the first surface 113. The first surface 113 or the second surface 114 of the sheet 112 (or both) has an opaque coating except along a vertically extending window 126, along which window 126 are printed indications (i.e., 5, 10, 20, 25 PSI) of the pressure that is required to just cause the deformable layer 122 to wet part or all of the recessed surface portions of the reflective structure 116 behind that indication. Such wetting of part or all of the recessed surface portions of the reflective structure 116 causes light to pass through the second surface 114 of the sheet 112 along the wetted recessed surface portions instead of being reflected, thereby causing significant visually observable changes in the appearance of the reflective structure 116 at an observation angle in the predetermined range of observation angles with respect to the first surface 113 to indicate that the indicated predetermined pressure has been applied. Thus, the reflective structure 116 can provide an indication of the amount of pressure that has been applied between the first surface 113 of the sheet 112 and the outer surface 124 of the deformable layer 122, that indication being about 25 PSI as illustrated, below which indication the deformable layer 122 can be seen through the sheet 112, and above which indication the reflective structure 116 reflects light back through the first surface 113 of the sheet 112.

As an alternate structure for the pressure indicating structure 110 the reflective structure 116 could be of the type of reflective structure 16 described above with reference to FIGS. 3 and 4 and could only be present behind the window 126.

Figure 12:
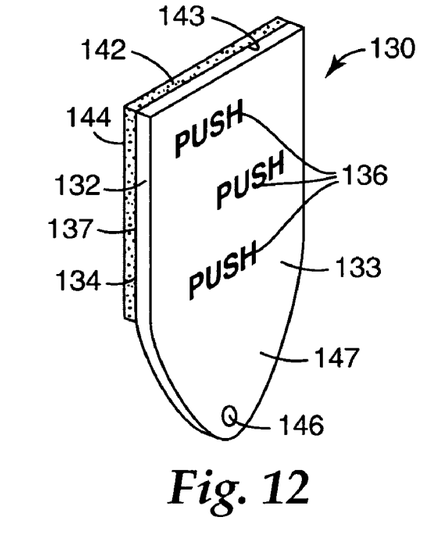
FIG. 12 is an isometric view of a sixth embodiment of a pressure indicating structure according to the present invention.
Figure 13:
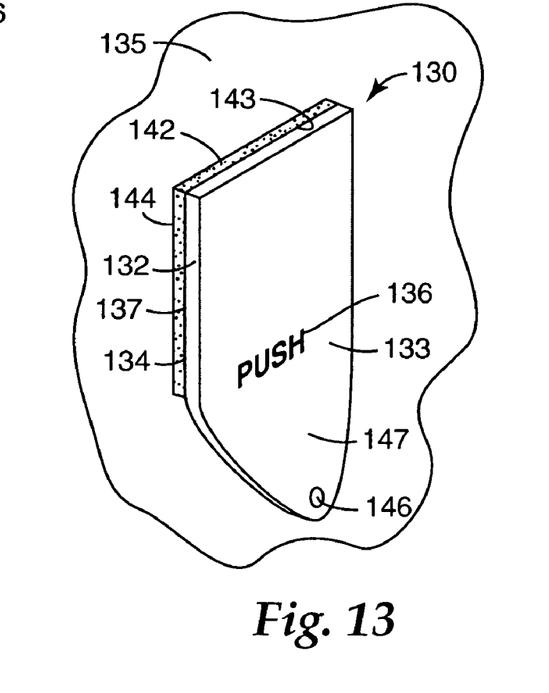
FIG. 13 is an isometric view of the pressure indicating structure of FIG. 12 indicating that pressure of a predetermined amount has been applied to adhere a major part of the pressure indicating structure to a surface.

FIGS. 12 and 13 illustrate a sixth embodiment of a pressure indicating structure according to the present invention generally indicated by the reference numeral 130. The structure of the pressure indicating structure 130 is similar to that of the pressure indicating structure 10 in that it comprises a translucent or transparent polymeric sheet or plate 132 having a portion 137 of its second major surface 134 that is planar, and has reflective structure similar to the reflective structure 16 of the pressure indicating structure 10 defining non-planar portions of its second surface 134, which reflective structure is in the shape of indicia 136 (i.e., the indicia "PUSH" as illustrated). The reflective structure in the shape of the indicia 136 reflects back through a first surface 133 of the sheet 132 at an observation angle in a predetermined range of observation angles with respect to that first surface 133 a visually significant amount of the light entering the sheet 132 through its first surface 133. The reflective structure, like the reflective structure 16 in the pressure indicating structure 10, comprises a multiplicity of peak portions and recessed portions having recessed surface portions of the second surface defining recesses from the peak portions. The pressure indicating structure 130 also includes a deformable layer 142 comprising pressure sensitive adhesive. The deformable layer 142 has opposite inner and outer major surfaces 143 and 144, both of which surfaces 143 and 144 are defined by the pressure sensitive adhesive. The inner surface 143 of the deformable layer 142 is supported along the second surface 134 of the sheet adjacent or in contact with the peak portions of the reflective structure, spaced from the recessed surface portions of the second surface 134, and adhered to the planar portion 137 of the second surface 134. The outer surface 144 of the deformable layer 142 can be used to adhere the structure 130 to a vertical surface 135 as is shown in FIG. 13. The shape and size of the peak portions and recessed portions of the reflective structure and the deformability of the deformable layer 142 are adapted so that at least a predetermined pressure is needed between the outer surface 144 of the deformable layer 142 and the first surface 133 of the sheet 132 to deform the pressure sensitive adhesive defining the inner surface 143 of the deformable layer 142 into the recesses to wet part or all of the recessed surface portions of the reflective structure defining that indicia 136. Such wetting of part or all of the recessed surface portions of the reflective structure causes light to pass through the second surface 134 of the sheet 132 along the wetted recessed surface portions instead of being reflected, thereby causing significant visually observable changes in the appearance of the reflective structure at an observation angle in the predetermined range of observation angles with respect to the first surface 133 (i.e., the reflective structure becomes much less visible or disappears) to indicate that at least the predetermined pressure has been applied. Thus, as illustrated, the disappearance of the reflective structure providing all but one of the "PUSH" indicia 136 provides an indication that at least the predetermined amount of pressure required to properly adhere a portion of the structure 130 to the vertical surface 135 has been applied against the first surface 133 of the sheet 132 and thereby between the outer surface 144 of the deformable layer 142 and the surface 135 except in the area of the remaining "PUSH" indicia 136. The structure of the pressure indicating structure 130 differs from that of the pressure indicating structure 10 in that the translucent or transparent polymeric sheet 132 is stiff but flexible. Like the plate 12, however, the sheet 132 has sufficient rigidity between its first and second major surfaces 133 and 134 to maintain the shape of the reflective structure in the shape of indicia 136 when the predetermined pressure is applied to deform the pressure sensitive adhesive defining the inner major surface 133 of the deformable layer 142 into engagement with the recessed surface portions of the reflective structure. Also, instead of having the distally headed portion 27 of the plate 12, the sheet 132 has a through opening 146 in a portion 147 projecting from and edge of the deformable layer 142 from which an object can be suspended after the structure 130 is adhered to the surface 135. Other means for attaching to or supporting objects could also be provided on the sheet 132.

Figure 14:
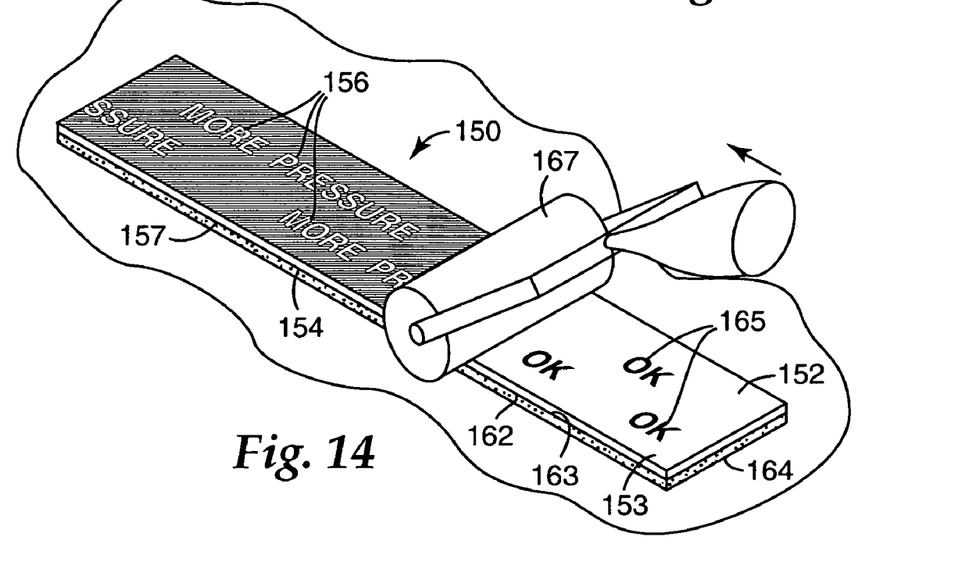
FIG. 14 is an isometric view of a seventh embodiment of a pressure indicating structure according to the present invention being pressed against a surface using a pressure roller.

FIG. 14 illustrates a seventh embodiment of a pressure indicating structure according to the present invention generally indicated by the reference numeral 150. The structure of the pressure indicating structure 150 is similar to that of the pressure indicating structure 10 in that it comprises a translucent or transparent polymeric sheet 152 having a portion 157 of its second major surface 154 that is planar, and has reflective structure similar to the reflective structure 16 of the pressure indicating structure 10 defining non-planar portions of its second surface 154. The pressure indicating structure 150, however, differs from that of pressure indicating structure 10, in that the regions of the second major surface 154 that include reflective structure and those regions free of reflective structure are reversed and the appearance of the indicia and the surrounding area are therefore interchanged. That is, in the illustrated embodiment, the indicia 156 is free of the reflective structure and at least the area around the indicia 156 is provided with sufficient reflective structure to provide contrast and with and thereby make the indicia 156 viewable. Stated another way, the reflective structure comprises at least the area immediately surrounding the indicia 156 (i.e., the indicia "MORE PRESSURE" as illustrated), thereby allowing a user viewing the structure to see through the polymeric sheet 152 and view the underlying adhesive within the area of the indicia 156. Even though the reflective structure has been described as being "around" or "surrounding" the indicia 156, it will be recognized that the reflective structure may also be provided within the enclosed areas of the indicia 156, such as within the enclosed areas of upper and lower case letters O and R. The reflective structure reflects back through a first surface 153 of the sheet 152 at an observation angle in a predetermined range of observation angles with respect to that first surface 153 a visually significant amount of the light entering the sheet 152 through its first surface 153. The reflective structure, like the reflective structure 16 in the pressure indicating structure 10, comprises a multiplicity of peak portions and recessed portions having recessed surface portions of the second surface defining recesses from the peak portions. The pressure indicating structure 150 also includes a deformable layer 162 comprising pressure sensitive adhesive. The deformable layer 162 has opposite inner and outer major surfaces 163 and 164. The inner surface 163 is defined by the pressure sensitive adhesive, whereas the outer surface 164 may or may not be defined by the pressure sensitive adhesive. The inner surface 163 of the deformable layer 162 is supported along the second surface 154 of the sheet adjacent (e.g., in contact with) the peak portions of the reflective structure, spaced from the recessed surface portions of the second surface 154. The shape and size of the peak portions and recessed portions of the reflective structure and the deformability of the deformable layer 162 are adapted so that at least a predetermined pressure is needed between the first surface 153 of the sheet 152 and the outer surface 164 of the deformable layer 162 to deform the pressure sensitive adhesive defining the inner surface 163 of the deformable layer 162 into the recesses to wet part or all of the recessed surface portions of the reflective structure defining the outline of indicia 156. Such wetting of part or all of the recessed surface portions of the reflective structure causes light to pass through the second surface 154 of the sheet 152 along the wetted recessed surface portions instead of being reflected, thereby causing significant visually observable changes in the appearance of the reflective structure at an observation angle in the predetermined range of observation angles with respect to the first surface 153 (i.e., the reflective structure defining the outline of indicia 156 becomes much less visible or disappears) to indicate that at least the predetermined pressure has been applied.

Indicia 165, such as symbols or words (e.g., the words "OK" as illustrated in FIG. 14 to indicate at least the predetermined pressure has been applied), are printed on the deformable layer 162 generally in the region under the reflective structure. Because the indicia 165 will be viewable through the indicia 156, it is preferred that the indicia 165 not be arranged directly beneath the indicia 156. The indicia 165 can be printed on the inner surface 163 of the deformable layer 162 (e.g., red or black indicia on white deformable material 162) or, if the deformable material 162 is of a transparent pressure sensitive adhesive, may alternatively be printed within the layer 162, or on its outer surface 164, or on a surface below or adhered to its outer surface 164). When viewed at an observation angle of about 60 to 90 degrees relative to sheet 152, the indicia 165 will become visible (or at least become more visible) to a viewer through the first surface 153 of the sheet 152 when the deformable layer 162 is pressed into the recesses of the reflective structure and wets part or all of the recessed surface portions.

Thus, as illustrated, when sufficient pressure is applied to the first surface 153 of the sheet 152, the "MORE PRESSURE" indicia 156 becomes less visible and the "OK" indicia 165 becomes more visible, thereby providing an indication that at least the desired predetermined amount of pressure has been applied (as by the roller 167 illustrated) against the first surface 153 of the sheet 152 and thereby between the first surface 153 of the sheet 152 and the outer surface 164 of the deformable layer 162. The structure of the pressure indicating structure 150 may also differ from that of the pressure indicating structure 10 in that the translucent or transparent polymeric sheet 152 is stiff but flexible.

Figure 15:
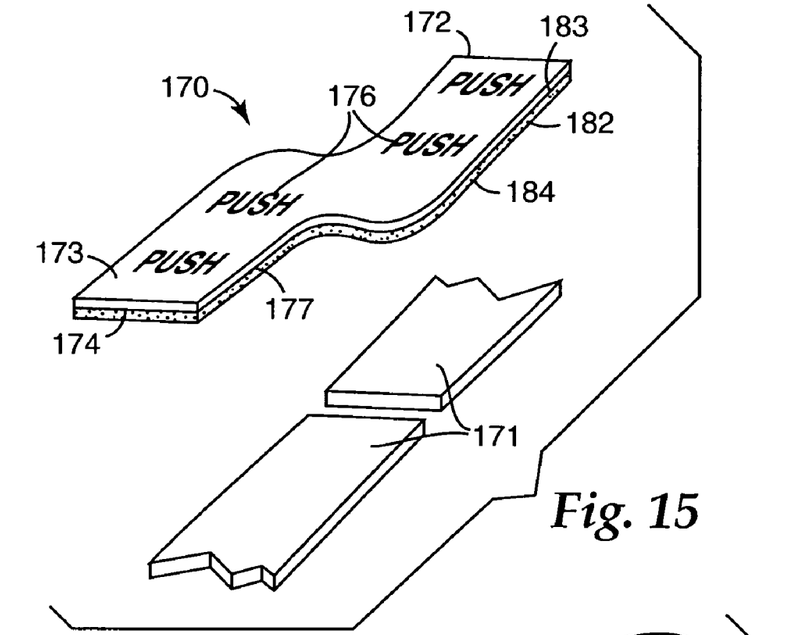
FIG. 15 is an isometric view of a eighth embodiment of a pressure indicating structure according to the present invention together with fragmentary views of the ends of strips or a belt that can be joined using the pressure indicating structure.

FIG. 15 illustrates an eighth embodiment of a pressure indicating structure according to the present invention generally indicated by the reference numeral 170 that can be used to join structures such as the illustrated end portions 171 of strips or a belt. The structure of the pressure indicating structure 170 is similar to that of the pressure indicating structure 10 in that it comprises a translucent or transparent polymeric sheet 172 having a portion 177 of its second major surface 174 that is planar, and has reflective structure similar to the reflective structure 16 of the pressure indicating structure 10 defining non-planar portions of its second surface 174, which reflective structure is in the shape of indicia 176 (i.e., the indicia "PUSH" as illustrated). The reflective structure in the shape of the indicia 176 reflects back through a first surface 173 of the sheet 172 at an observation angle in a predetermined range of observation angles with respect to that first surface 173 a visually significant amount of the light entering the sheet 172 through its first surface 173. The reflective structure, like the reflective structure 16 in the pressure indicating structure 10, comprises a multiplicity of peak portions and recessed portions having recessed surface portions of the second surface defining recesses from the peak portions. The pressure indicating structure 170 also includes a deformable layer 182 comprising an aggressive pressure sensitive adhesive (e.g., the aggressive pressure sensitive adhesive tape commercially designated Very High Bond (VHB) tape available from 3M Company, St. Paul, Minn.). The deformable layer 182 has opposite inner and outer major surfaces 183 and 184, both of which surfaces 183 and 184 are defined by the pressure sensitive adhesive. The inner surface 183 of the deformable layer 182 is supported along the second surface 174 of the sheet 172 over and adjacent (i.e., spaced from or in contact with) the peak portions of the reflective structure, spaced from the recessed surface portions of the second surface 174, and adhered to the planar portion 177 of the second surface 174. The outer surface 184 of the deformable layer 182 can be used to adhere opposite end portions of the structure 170 to the end portions 171 of the strips or a belt. The shape and size of the peak portions and recessed portions of the reflective structure and the deformability of the deformable layer 182 are adapted so that at least a predetermined pressure is needed between the outer surface 184 of the deformable layer 182 and the first surface 173 of the sheet 172 to deform the pressure sensitive adhesive defining the inner surface 183 of the deformable layer 182 into the recesses to wet part or all of the recessed surface portions of the reflective structure defining that indicia 176. Such wetting of part or all of the recessed surface portions of the reflective structure causes light to pass through the second surface 174 of the sheet 172 along the wetted recessed surface portions instead of being reflected, thereby causing significant visually observable changes in the appearance of the reflective structure at an observation angle in the predetermined range of observation angles with respect to the first surface 173 (i.e., the reflective structure becomes much less visible or disappears) to indicate that at least the predetermined pressure has been applied. Thus, the disappearance of the reflective structure providing the "PUSH" indicia 176 provides an indication that at least the predetermined amount of pressure required to properly adhere the end portions of the structure 170 to the end portions 171 of the strips or a belt has been applied against the first surface 173 of the sheet 172 and thereby between the outer surface 184 of the deformable layer 182 and the end portions 171 of the strips or a belt to properly adhere the pressure sensitive adhesive of the deformable layer 182 to those end portions 171. The structure of the pressure indicating structure 170 differs from that of the pressure indicating structure 10 in that the translucent or transparent polymeric sheet 172 is flexible. Like the plate 12, however, the sheet 172 has sufficient rigidity between its first and second major surfaces 173 and 174 to maintain the shape of the reflective structure in the shape of indicia 176 when the predetermined pressure is applied to deform the pressure sensitive adhesive defining the inner major surface 173 of the deformable layer 182 into engagement with the recessed surface portions of the reflective structure.

Figure 16:
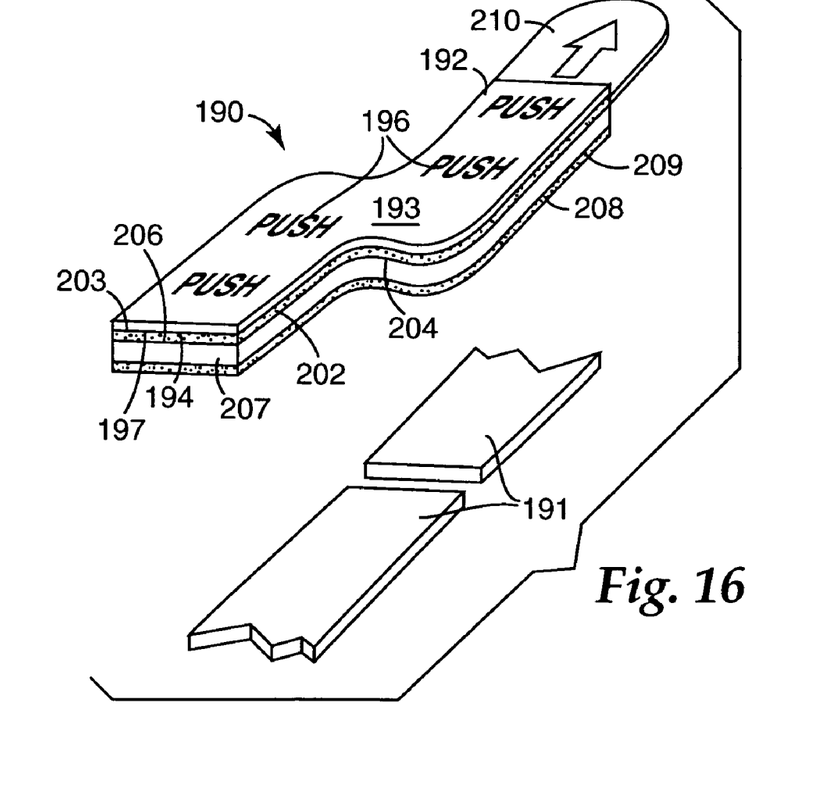
FIG. 16 is an isometric view of a ninth embodiment of a pressure indicating structure according to the present invention together with fragmentary views of the ends of strips or a belt that can be joined using the pressure indicating structure.

FIG. 16 illustrates a ninth embodiment of a pressure indicating structure according to the present invention generally indicated by the reference numeral 190 that, like the pressure indicating structure 170, can be used to join structures such as the illustrated end portions 191 of strips or a belt. Like the pressure indicating structure 170, the pressure indicating structure 190 comprises a translucent or transparent polymeric sheet 192 having a portion 197 of its second major surface 194 that is planar, and having reflective structure similar to the reflective structure 16 of the pressure indicating structure 10 defining non-planar portions of its second surface 194, which reflective structure is in the shape of indicia 196 (i.e., the indicia "PUSH" as illustrated). The reflective structure in the shape of the indicia 196 reflects back through a first surface 193 of the sheet 192 at an observation angle in a predetermined range of observation angles with respect to that first surface 193 a visually significant amount of the light entering the sheet 192 through its first surface 193. The reflective structure, like the reflective structure 16 in the pressure indicating structure 10, comprises a multiplicity of peak portions and recessed portions having recessed surface portions of the second surface defining recesses from the peak portions. The pressure indicating structure 190 also includes a deformable layer 202 comprising a stretch release pressure sensitive adhesive (e.g., the deformable layer 202 being formed by a strip of the stretch release pressure sensitive adhesive commercially designated "Command"™ adhesive or "Command"™ strip that is available from 3M Company). The deformable layer 202 has opposite inner and outer major surfaces 203 and 204, both of which surfaces 203 and 204 are defined by the pressure sensitive adhesive. The inner surface 203 of the deformable layer 202 is supported along the second surface 194 of the sheet 192 adjacent (e.g., slightly spaced from or in contact with) the peak portions of the reflective structure, spaced from the recessed surface portions of the second surface 194, and adhered to the planar portion 197 of the second surface 194. The outer surface 204 of the deformable layer 202 is adhered to a top surface 206 of a joining strip 207 of material that can be of high strength and/or flexible and/or tuff (e.g., leather, rubber or metal) that can be significantly stronger and/or more flexible than the sheet 192 and need not be transparent. The joining strip 207 has a layer 208 comprising an aggressive pressure sensitive adhesive (e.g., the aggressive pressure sensitive adhesive tape commercially designated Very High Bond (VHB) tape available from 3M Company) adhered along a bottom surface 209 opposite its top surface 206. The pressure indicating structure 190 can be used to adhere opposite end portions 191 of the joining strip 207 to the end portions 191 of the strips or a belt. The shape and size of the peak portions and recessed portions of the reflective structure and the deformability of the deformable layer 202 are adapted so that at least a predetermined pressure is needed between the outer surface 204 of the deformable layer 202 and the first surface 193 of the sheet 192 to deform the pressure sensitive adhesive defining the inner surface 203 of the deformable layer 202 into the recesses to wet part or all of the recessed surface portions of the reflective structure defining that indicia 196. Such wetting of part or all of the recessed surface portions of the reflective structure causes light to pass through the second surface 194 of the sheet 192 along the wetted recessed surface portions instead of being reflected, thereby causing significant visually observable changes in the appearance of the reflective structure at an observation angle in the predetermined range of observation angles with respect to the first surface 193 (i.e., the reflective structure becomes much less visible or disappears) to indicate that at least the predetermined pressure has been applied. Thus, the disappearance of the reflective structure providing the "PUSH" indicia 196 provides an indication that at least the predetermined amount of pressure required to properly adhere the end portions of the joining strip 207 to the end portions 191 of the strips or a belt has been applied against the first surface 193 of the sheet 192 and thereby (when the outer surface of the layer 208 of aggressive pressure sensitive adhesive is positioned along the end portions 191 of the strips or a belt) between the outer surface of the layer 208 of aggressive pressure sensitive adhesive and the end portions 191 of the strips or a belt to properly adhere that layer 208 to those end portions 191 so that the joining strip 207 joins those end portions 191. Such predetermined amount of pressure can be applied by supporting the end portions 191 of the strips or belt on a firm surface and pressing the first surface 193 toward that firm surface, or by pressing the first surface 193 toward the end portions 191 with a tool such as a pliers having one jaw on the first surface 193 and the other jaw on the surface of the end portions 191 opposite the joining strip 207. After the joining strip 207 is adhered between the end portions 191 by the layer 208 of aggressive pressure sensitive adhesive the polymeric sheet 192 can be removed from the joining strip 207 by grasping a tab 210 portion of the deformable layer 202 projecting from an end of the joining strip 207 and pulling to stretch the deformable layer 202 of stretch release adhesive so that it is no longer adhered to either the sheet 192 or the joining strip 207. The pressure indicating structure 190 can be adapted to join the end portions 191 of strips or a belt that are wider than the deformable layer 202 formed by the strip of the stretch release pressure sensitive adhesive commercially designated "Command"™ adhesive by using two or more such strips to form the deformable layer 202. Two or more such strips are preferred for this use instead of one wider strip because one wider strip would be hard to stretch to release its adhesion to the sheet 192 and the joining strip 207.

Pressure indicating structures according to the present invention can be used for many different purposes. For example pressure indicating structures generally of the type described above with reference to FIGS. 6 through 8 can be used as a tamper indicating label such as around the lid of a jar, or on the handle of a device such as the handle for a latch on a secured cabinet containing emergency equipment; such labels being adapted to give an indication when pressure needed to open the lid or latch has been applied to the lid or handle. A pressure indicating structure of the type described above with reference to FIGS. 9 and 10 or to FIG. 11 could be placed between planar surfaces of a connector at the ends of two lengths of cable or rope in such a manner that tension applied through the two lengths of cable or rope would apply pressure between the opposite surfaces of the pressure indicating structure. The pressure indicating structure could then indicate the maximum amount of tension applied through the two lengths of cable or rope. A number of pressure indicating structures of the type described above with reference to FIGS. 9 and 10 or to FIG. 11 could be placed along a structure such as a car seat, back rest, shoe arch support, handle or hand grip to record the force or pressure distribution that occurs when those structures are used. An inexpensive device for measuring the force resulting from earthquakes and indicating the direction in which that force was applied could be made by placing a continuous row of pressure indicating structures of the type described above with reference to FIGS. 9 and 10 or to FIG. 11 along the inner surface of a cylindrical tube having one end supported on a horizontal planar surface and its axis projecting upwardly, and placing an end of a cylindrical weight on that planar surface so that its axis is coaxial with the axis of the tube. An earthquake would cause the weight to slide against and impact one or more of the pressure indicating structures which would then give an indication of the severity and direction of the earthquake by pressure readings on the structures. With experimentation such pressure reading could be correlated with or interpreted as Rictor Scale measurements. Also, a pressure indicating structure of the type described above with reference to FIGS. 9 and 10 or to FIG. 11 could be used to make an inexpensive torque wrench by placing it between a surface fixed to a socket drive and a surface fixed to a force application handle mounted on the socket drive for rotation about the axis of the socket drive.

The present invention has now been described with reference to several embodiments and modifications thereof. It will be apparent to those skilled in the art that many further changes can be made in the embodiments described above without departing from the scope of the present invention. Thus, the scope of the present invention should not be limited to the structures and methods described in this application, but only by the structures and method described by the language of the claims and the equivalents thereof.

What is claimed is:

1. A pressure indicating structure comprising:
   a translucent or transparent sheet having opposite first and second major surfaces, reflective structure defining at least a portion of said second surface for reflecting back through said first surface at an observation angle in a predetermined range of observation angles with respect to said first surface a visually significant amount of the light entering said sheet through said first surface, said reflective structure comprising a multiplicity of peak portions and recessed portions having recessed surface portions of said second surface defining recesses from said peak portions; and
   a deformable layer comprising pressure sensitive adhesive, said deformable layer having opposite major surfaces with one of said surfaces being defined by said pressure sensitive adhesive and being supported along said second surface of said sheet adjacent said peak portions of said reflective structure and spaced from said recessed surface portions of said second surface;
   the shape and size of the peak portions and recessed portions of the reflective structure and the deformability of the deformable layer are adapted so that a predetermined pressure is needed between the surface of the deformable layer opposite the reflective structure and the first surface of the sheet to deform the pressure sensitive adhesive defining the first surface of the deformable layer into the recesses to wet part or all of the recessed surface portions of the reflective structure, and said wetting of part or all of the recessed surface portions of said reflective structure causes light to pass through said second surface along the wetted recessed surface portions instead of being reflected, thereby causing significant visually observable changes in the reflectivity of said reflective structure at an observation angle in said predetermined range of observation angles to indicate that said predetermined pressure has been applied.

2. A pressure indicating structure according to claim 1 wherein said second surface of said translucent or transparent sheet has a planar surface portion, said one of said major surfaces of said deformable material is adhered to said planar surface portion so that deformable material can be seen through said first surface and said planar surface portion of said translucent or transparent sheet, said reflective structure defines a plurality of portions of said second surface for reflecting light directed into said sheet through said first surface back through said first surface at an observation angle in the predetermined range of observation angles with respect to said first surface, and said plurality of portions of said second surface are in the form of indicia visible through said first surface, said sheet including said reflective structure being formed of one material so that when said pressure sensitive adhesive of said deformable layer is pressed into the recesses of said reflective structure by said predetermined pressure to wet part or all of the recessed surface portions of said reflective structure the deformable material will be seen through said first surface and said wetted recessed surface portions so that the visibility of said indicia through said first surface at an observation angle in said predetermined range of observation angles with respect to said first surface will be significantly decreased to indicate that said predetermined pressure has been applied.

3. A pressure indicating structure according to claim 2 wherein said indicia are distributed around said second surface of said sheet and indicate when said pressure sensitive adhesive of said deformable layer is pressed into the recesses of said reflective structure and the visibility of said indicia through said first surface at an observation angle in said predetermined range of observation angles with respect to said first surface is significantly decreased that said predetermined pressure has been applied over the entire first surface of said sheet.

4. A pressure indicating structure according to claim 3 wherein said sheet includes a hook or means projecting from said first surface of said sheet for supporting a hook or other items, and said pressure sensitive adhesive of said deformable layer defines said major surface of said deformable layer opposite said sheet to afford adhering said structure to a surface.

5. A pressure indicating structure according to claim 3 wherein some of said indicia are distributed along said second surface of said sheet and require different amounts of predetermined pressure to press said pressure sensitive adhesive of said deformable layer into the recesses of said reflective structure.

6. A pressure indicating structure according to claim 5 wherein said indicia indicate the different amounts of predetermined pressure required to press said pressure sensitive adhesive of said deformable layer into the recesses of said reflective structure forming the indicia.

7. A pressure indicating structure according to claim 5 wherein said plate bears indicia indicating the different amounts of predetermined pressure required to press said pressure sensitive adhesive of said deformable layer into the recesses adjacent said indicia.

8. A pressure indicating structure according to claim 1 wherein said deformable layer has a color visible through the first surface of said sheet at an observation angle in said predetermined range of observation angles with respect to said first surface only when said pressure sensitive adhesive of said deformable layer wets recessed surface portions of said reflective structure to cause light to pass through said second surface along the wetted recessed surface portions.

9. A pressure indicating structure according to claim 1 including indicia on or behind the deformable layer, said indicia being visible through the first surface of said sheet at an observation angle in said predetermined range of observation angles with respect to said first surface only when said pressure sensitive adhesive of said deformable layer wets recessed surface portions of said reflective structure to cause light to pass through said second surface along the wetted recessed surface portions.

10. A pressure indicating structure according to claim 1 wherein said recessed surfaces are recessed a maximum of about 0.007 inch or 0.018 cm from said peak portions.

11. A pressure indicating structure according to claim 1 wherein:

said translucent or transparent sheet has reflective structure defining a plurality of portions of said second surface for reflecting light directed into said sheet through said first surface back through said first surface at an observation angle in said predetermined range of observation angles with respect to said first surface, said plurality of portions of said second surface being in the form of indicia visible through said first surface, so that when said pressure sensitive adhesive of said deformable layer is pressed into the recesses of said reflective structure to wet part or all of the recessed surface portions of said reflective structure the visibility of said indicia through said first surface at said predetermined angle will be significantly decreased; and said deformable layer has a color or bears indicia visible through the first surface of said sheet at a predetermined angle with respect to said first surface only when said pressure sensitive adhesive of said deformable layer wets recessed surface portions of said reflective structure to cause light to pass through said second surface along the wetted recessed surface portions.

12. A pressure indicating structure according to claim 1 wherein said translucent or transparent sheet is molded and rigid.

13. A pressure indicating structure according to claim 1 wherein said translucent or transparent sheet is flexible while having sufficient rigidity between its first and second major surfaces to maintain the shape of the reflective structure when the predetermined pressure is applied to deform the pressure sensitive adhesive defining the first surface of the deformable layer into the recesses to wet part or all of the recessed surface portions of the reflective structure.

14. A pressure indicating structure according to claim 1 wherein said reflective structure is flexible and will deform when the predetermined pressure is applied to deform the pressure sensitive adhesive defining the first surface of the deformable layer into the recesses to wet part or all of the recessed surface portions of the reflective structure.

15. A pressure indicating structure according to claim 1 wherein said translucent or transparent sheet comprises a flexible cast or extruded layer defining said second surface, and a rigid layer defining said first surface to which said cast or extruded layer is attached.

16. A pressure indicating structure according to claim 1, wherein the reflective structure defines an outline of first indicia defined by a region free of reflective structure, whereby when the reflective structure is wetted out by the deformable layer, the contrast between the first indicia and the region defined by the reflective structure is reduced and the first indicia becomes less visible.

17. A pressure indicating structure according to claim 16, further comprising second indicia arranged beneath at least a portion of said reflective structure, whereby said second indicia is viewable through the reflective structure when the surface of the reflective structure is wetted out by the deformable layer.

* * * * *